United States Patent [19]
Cosgrove

[11] Patent Number: 5,318,704
[45] Date of Patent: Jun. 7, 1994

[54] APPARATUS FOR FILTERING AND COALESCING LIQUIDS

[75] Inventor: Ronald C. Cosgrove, Alton, England

[73] Assignee: Kalsep Limited, Camberley, England

[21] Appl. No.: 53,516

[22] PCT Filed: Sep. 21, 1989

[86] PCT No.: PCT/GB89/01115
§ 371 Date: Mar. 21, 1991
§ 102(e) Date: Mar. 21, 1991

[87] PCT Pub. No.: WO90/03212
PCT Pub. Date: Apr. 5, 1990

Related U.S. Application Data

[63] Continuation of Ser. No. 671,784, Mar. 21, 1991, abandoned.

[30] Foreign Application Priority Data

Sep. 22, 1988 [GB] United Kingdom ............... 8822249

[51] Int. Cl.⁵ ............................................. B01D 24/46
[52] U.S. Cl. ..................... 210/352; 210/359; 210/385; 210/497.01; 55/475; 55/510; 55/527
[58] Field of Search ................ 55/475, 527, 510; 210/350, 351, 352, 359, 497.01, 385

[56] References Cited

U.S. PATENT DOCUMENTS 4,411,791 10/1983 Ward ................................. 210/351

FOREIGN PATENT DOCUMENTS

| 207797 | 3/1985 | European Pat. Off. . |
| 1959867 | 11/1969 | Fed. Rep. of Germany . |
| 2249603 | 10/1972 | Fed. Rep. of Germany . |
| 986457 | 3/1981 | U.S.S.R. . |
| 1375628 | 10/1972 | United Kingdom . |
| 2083371 | 3/1982 | United Kingdom . |

*Primary Examiner*—Robert A. Dawson
*Assistant Examiner*—W. L. Walker
*Attorney, Agent, or Firm*—D. J. Untener; B. L. Mehosky

[57] ABSTRACT

An apparatus for removing contaminants from a liquid comprises a casing and a tubular filter dividing the casing into two compartments. The tubular filter is formed of fibers attached at each end to end supports which are movable axially relative to one another and rotatable relative to one another about the longitudinal axis of the filter. A helical spring is disposed within the tubular filter and is so dimensioned that it does not close when the end supports are in their closest operational position. The spring resists inward movement of the fibers when the end supports are moved axially towards each other and rotated to twist the fiber, thereby preventing the compartment defined by the interior of the tubular filter from tending to close.

5 Claims, 1 Drawing Sheet

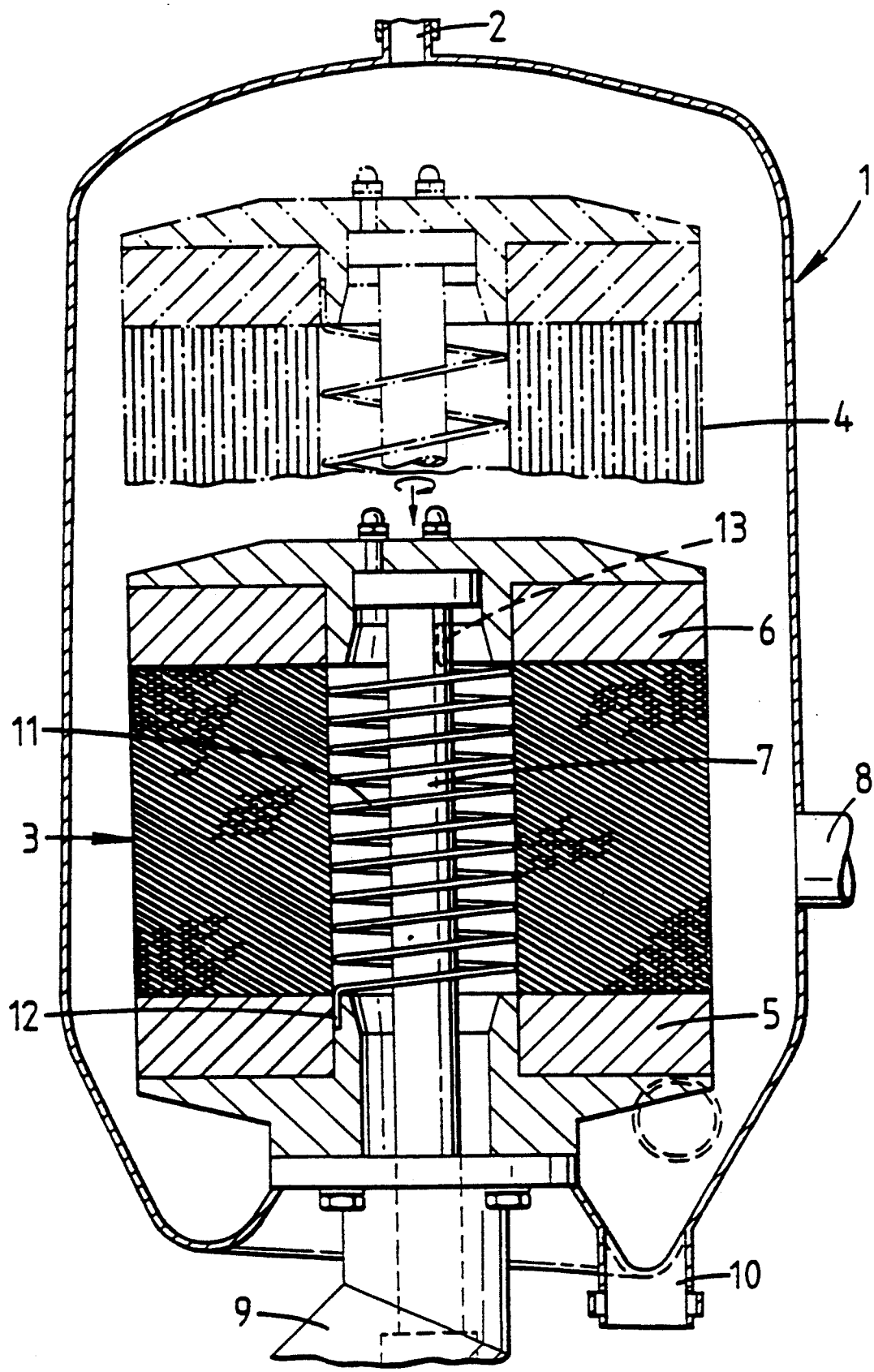

APPARATUS FOR FILTERING AND COALESCING LIQUIDS

This application is a continuation of application Ser. No. 07/671,784 filed Mar. 21, 1991, now abandoned, which is based on International Application PCT/GB89/01115, filed Sep. 21, 1989, which in turn is based on British Application 8822249.2, filed Sep. 22, 1988. Priority based on all such earlier application is claimed.

The present invention relates to apparatus for filtering solids from liquids or for coalescing droplets of one liquid dispersed in another liquid.

EP 0 004 724 discloses an apparatus for removing contaminants from a liquid which comprises bundles of fibres aligned parallel to one another between two end plates. The end plates may be moved axially to stretch or compress the fibres. Liquid flows through the apparatus parallel to the fibre bundles.

EP 0 207 797 discloses another apparatus for removing contaminants from a liquid. This apparatus also comprises fibres connected at each end to end supports, which end supports can be moved away from or towards each other to place the fibres under tension or to relax any applied tension. The end supports can also be rotated relative to each other. The fibres are attached to the end supports so as to form a tube of fibres surrounding a central tubular core provided with perforations. The fibres are in turn surrounded by a perforated tube which restrains the fibres from radial movement (in relation to the axis of the tubular core). The liquid to be treated passes across the fibres between the central core and an outer compartment surrounding the fibres. In use the end supports are moved towards one another and rotated relative to one another to twist the fibres and to compress them against the perforated tube.

An arrangement of perforated inner and outer tubes with fibres arranged parallel to the axis of the tubes is disclosed in U.S. Pat. No. 4 299 699.

The disadvantage of using perforated inner tubes is that they impose a restriction on the flow through the apparatus so giving increased pressure drop if the rate of flow is to be sustained. Because liquid can only pass through relatively narrow openings the local liquid velocity near these openings will be relatively high which may disturb particles of contaminants already deposited on the fibres. The techniques required to produce perforated tubes will also increase the cost of the apparatus. In the case of apparatus which requires both axial as well as rotary movement of the end supports it will be necessary to provide lengths of perforated tube in excess of the length required to give support to the fibre bundle in the shortened operational position in order to be able to support the fibres in the elongated position required for back-washing. This will increase the mechanical complexity of the apparatus. The production of perforated tube is a relatively expensive process. It would be desirable to provide an apparatus which did not require a perforated inner tube but which replaced it by a cheap and easily available component which gave reduced pressure drop.

According to the present invention an apparatus for removing contaminants from a liquid, which apparatus comprises a casing, divided into two compartments by a tubular fibrous filter, said fibrous filter being formed of fibres attached at each end to an end support, said end supports being moveable axially relative to one another, and rotable relative to one another about the longitudinal axis of the tubular fibrous filter, is characterised in that a helical spring is disposed within the tubular fibrous filter and is so dimensioned that it does not close when the end supports are in their closest operational position and resists inward movement of the fibres tending to close the compartment surrounded by the tubular filter when the end supports are moved axially towards each other and rotated to twist the fibre.

By using a helical spring in place of the perforated tube of the present invention adequate support can be given to the tubular fibrous filter both during use and during backwashing to remove impurities. Helical springs are relatively easy to manufacture and were therefore cheaper than using perforated tubes which will require more expensive fabrication techniques for their manufacture. The helical spring can be used to replace only the inner perforated tube disclosed in EP0 027 797. However it is preferred to eliminate the outer perforated tube also. The fibres can be kept in compression by controlling the sequence of rotation and axial movement instead. The radial force exerted by the helical spring is sufficient to support the fibres as the bed of fibres forming the tubular filter contracts under the torsional stress applied by relative rotation of the end supports.

The spring is so dimensioned that it does not close when the distance between the end supports is at its operational minimum, i.e. the turns of the spring do not come into contact so preventing passage of liquid through the filter.

The ends of the spring can be free to rotate relative to the end supports. However this will tend to produce wear of the end supports unless the additional expense and complication of providing some kind of bearing is incurred. It is therefore preferred to fix the spring to the end supports at both ends. It is an advantage of the present invention that the spring can accommodate the torsion resulting from the relative rotation of the end supports without giving any excessive increase in the torque needed to give the required relative rotation of the end supports.

The length of the spring can be such that it is in a neutral state (neither in compression or tension) when the end supports are at their maximum operational relative axial distance. It has been found preferable, however, for the length of the spring to be selected such that it is in the neutral state when the axial distance between the end supports is at the minimum operational value.

The spacing of the turns of the spring is preferably such as to give the maximum open area between the turns so as to minimise pressure drop and to avoid high flow rate regions.

A specific embodiment of the invention will now be illustrated by reference to the accompanying figure which is a cross-section through an apparatus according to the invention.

The apparatus comprises a casing (1), having a vent (2) at its upper end. The vent (2) will normally be closed off by a pressure relief valve or a pressure gauge in use. The casing is divided into two compartments by a tubular fibrous filter, indicated generally at (3). The fibrous filter comprise bundles of fibres secured at each end to end supports (5) and (6). End support (5) is fixed to the casing (1). End support (6) is attached to an actuating rod (7) by which can it can be moved axially towards end support (5) and also rotated relative to end support (5). A liquid inlet (8) is provided in casing (1), opening into the outer compartment surrounding the tubular filter. A liquid outlet (9) is provided in the base of the casing, opening into the compartment within the tubular filter.

A drain outlet (10) is provided through which the casing can be drained if required. A helical spring (11) is disposed within the space within the tubular filter (3). One end (12) of the spring (11) is anchored in an opening in fixed end support (5). The other end (13) is anchored in moveable end support (6).

In use the moveable end support (6) is moved from the position shown in dotted lines in FIG. 1 to the position shown in full lines by retraction and rotation of the actuating rod. As a consequence the fibres move from a position in which they are parallel to the axis of the filter to one in which they are inclined to the axis. As a result the individual fibres are forced closer together so increasing their efficiency at trapping particles in the fluid or coalescing droplets of immisicible liquid.

The movement of the actuating rod compresses the spring so that it continues to provide support over the whole length of the fibres without the complex mechanical arrangement shown in EP 0 207 797.

When the tubular fibrous filter is rotated and compressed the spring provides radial support for the stressed fibres and allows the end plates to rotate and compress the tubular fibrous bed by accepting torsion and compression within the spring due to the low stiffness of the spring in the torsional and axial axes but high rigidity in the radial direction.

When it is desired to clean the filter the actuating rod (7) is extended and rotated to return the moveable end support to the position shown in dotted lines. This increases the spacing between the fibres so facilitating backwashing.

I claim:

1. An apparatus for removing contaminants from a liquid, which apparatus comprises a casing, divided into two compartments by a tubular fibrous filter, said fibrous filter being formed of fibres attached at each end to an end support, said end supports being moveable axially relative to one another, and rotable relative to one another about the longitudinal axis of the tubular fibrous filter, said apparatus further comprising a helical spring disposed within the tubular filter and is so dimensioned that it does not close when the end supports are in their closest operational position and resists inward movement of the fibres tending to close the compartment surrounded by the tubular filter when the end supports are moved axially towards each other and rotated to twist the fibre.

2. The apparatus according to claim 1 in which the spring is fixed to the end supports at both of its ends.

3. The apparatus according to claim 1 wherein the length of the spring is such that it is in a neutral state when the axial distance between the end supports is at a minimum operational value.

4. The apparatus according to claim 2 wherein the length of the spring is such that it is in a neutral state when the axial distance between the end supports is at a minimum operational value.

5. The apparatus of claim 1 wherein said helical spring is cylindrical.

* * * * *